United States Patent [19]
Auger

[11] Patent Number: 4,995,946
[45] Date of Patent: Feb. 26, 1991

[54] METHOD AND APPARATUS FOR ACHIEVING BALANCED FLOW ON MULTIPASS DISTILLATION TRAYS

[75] Inventor: Robert G. Auger, Monroeville Borough, Pa.

[73] Assignee: Aristech Chemical Corporation, Pittsburgh, Pa.

[21] Appl. No.: 419,557

[22] Filed: Oct. 10, 1989

[51] Int. Cl.⁵ .......................... B01D 3/26; B01F 3/04
[52] U.S. Cl. ..................................... 203/99; 202/158; 261/114.1
[58] Field of Search .................. 202/158, 232; 203/99, 203/1; 261/114.1, 114.5

[56] References Cited

U.S. PATENT DOCUMENTS

| | | | |
|---|---|---|---|
| 3,053,521 | 9/1962 | Plaster et al. | 261/114 |
| 3,401,092 | 9/1968 | Matta | 203/1 |
| 3,445,094 | 5/1969 | Shobe | 261/114 |
| 3,729,179 | 4/1973 | Keller | 261/114.1 |
| 3,784,175 | 1/1974 | Hirao et al. | 261/114.1 |
| 3,985,623 | 10/1976 | Morgan et al. | 203/3 |
| 4,036,918 | 7/1977 | Morgan et al. | 261/114.1 |
| 4,089,752 | 5/1978 | Hancock, II | 202/158 |
| 4,129,626 | 12/1978 | Mellbom | 261/114.3 |
| 4,167,475 | 9/1979 | Winter, III et al. | 208/355 |
| 4,318,870 | 3/1982 | Haselden | 261/114.1 |
| 4,361,469 | 11/1982 | Trutna | 203/99 |
| 4,496,430 | 1/1985 | Jenkins | 203/98 |
| 4,504,426 | 3/1985 | Chuang et al. | 261/114.1 |
| 4,510,023 | 4/1985 | Bennett et al. | 203/99 |
| 4,547,326 | 10/1985 | Weiler | 261/114.1 |
| 4,749,528 | 6/1988 | Lavin | 261/114.1 |
| 4,750,975 | 6/1988 | Parker et al. | 261/75 |

FOREIGN PATENT DOCUMENTS 0565953  11/1958  Canada ............................... 202/158

Primary Examiner—Virginia Manoharan
Attorney, Agent, or Firm—William L. Krayer

[57] ABSTRACT

A multipass distillation or other column having substantially horizontal trays is constructed to equilibrate the liquid to vapor ratio on both sides of a downcomer, each side having the same area but a different shape, by adjusting the clearances under each side of said downcomer until the ratio of liquid passing to a first side to liquid passing to the other side is the same as the ratio of vapor passing to said first side as vapor passing to the other.

2 Claims, 2 Drawing Sheets

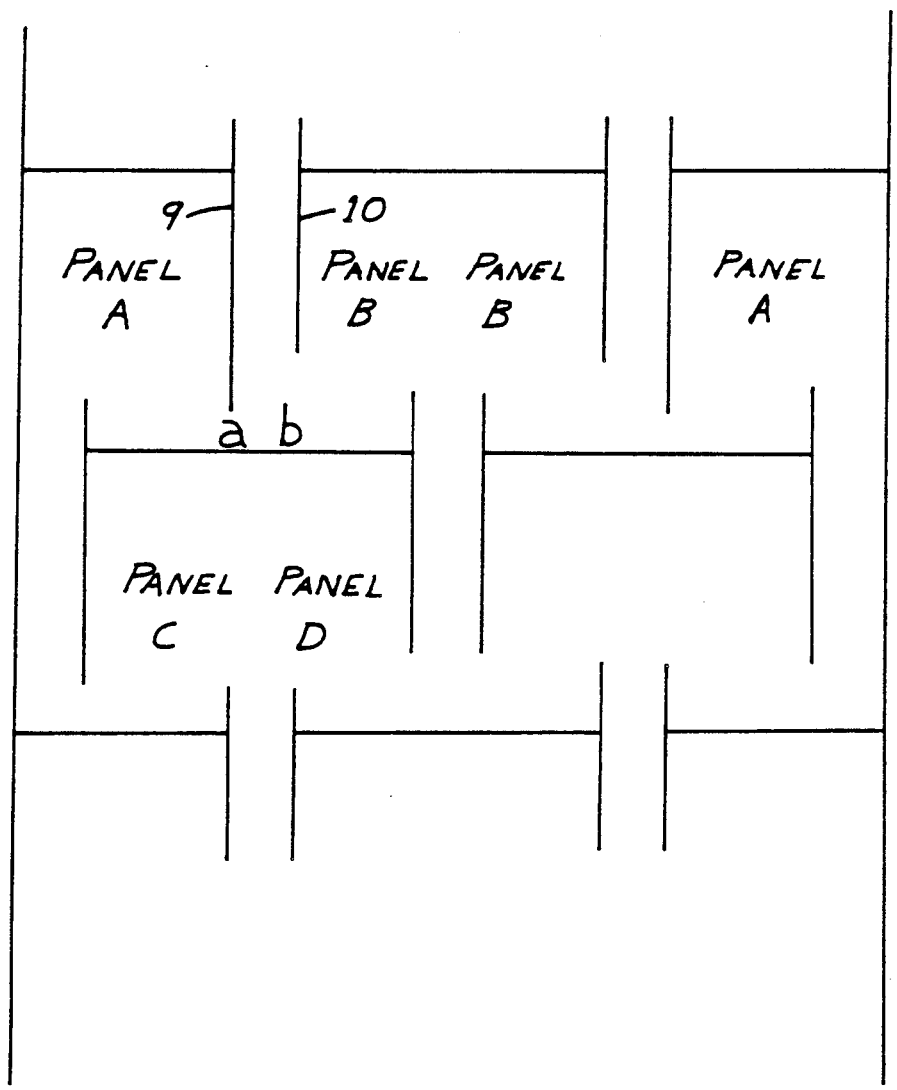

METHOD AND APPARATUS FOR ACHIEVING BALANCED FLOW ON MULTIPASS DISTILLATION TRAYS

TECHNICAL FIELD

This invention relates to distillation columns and to the design of multipass distillation columns in particular, where it is desired to maintain a constant ratio of liquid to vapor flow on each side of a downcomer in spite of different shapes of the trays or other horizontal areas on each side. The constant ratio is achieved by adjusting the spaces under the downcomer baffles while maintaining other factors at the optimum or otherwise desired value.

BACKGROUND ART

A common problem in the art of designing large multipass (3 or 4 pass) distillation trays and columns has been the problem of maintaining balanced ratios of liquid to gas throughput on each side of a multipass configuration. Typically the column itself is cylindrical; given a circular cross-section and chordal downcomers, it is generally accepted to design the areas on each side of the downcomers, which have different geometric shapes, to have the same areas or the same flow path length and generally similar perforations or other holes for gas throughput. If, during design, equal flow rates and/or treatment conditions such as liquid to vapor ratios are not achieved, which is commonly the case, the flow areas and/or height of the liquid in each tray area will be adjusted in order to achieve a balanced liquid to vapor ratio. The height and/or top grade of the liquid is commonly adjusted by adjusting the relative heights of the retaining weirs. Even though the same areas are usually involved, and the same number and size of orifices are provided for the passage of vapor, flows will vary considerably on different sides of the downcomers merely because the shapes of the areas will tend to affect the flow rates, which in turn affects the heights (depth) of liquid on the tray surface, which in turn affects the rate of gas or vapor throughput. Each of the effects mentioned on one side of a downcomer in turn affects the liquid to vapor ratio on the other side. Such a dynamic system is very difficult to control, much less anticipate, empirically, yet many distillation tower designers attempt to do so, most commonly by adjusting weir heights and shapes.

Various workers in the art have tried to control or anticipate the problems of imbalanced L/V ratios in different ways. See, for example, Keller's U.S. Pat. No. 3,729,179, which controls the horizontal flow patterns in a two-pass system by using a plurality of orifice-adjusting devices placed on the downcomer, together with vanes 19. Shobe, in U.S. Pat. No. 3,445,094, discloses a multipass system in which unequal areas are used on each side of the downcomer and baffles are provided for the downcomer to adjust the areas of the openings thereunder to be proportional to the unequal areas of the trays.

The reader may also be interested in U.S. Pat. No. 3,784,175, providing for downcomer openings which are adjustable according to fluctuations in fluid loads, and U.S. Pat. No. 4,036,918, which monitors overflash by a pressure differential at points near a downcomer and a weir.

Although the above methods of control are technically sound, they are unnecessarily complicated, and difficult to put into practice. Especially if the column is already constructed and in service.

SUMMARY OF THE INVENTION

According to the present invention, the ratio of the flow of liquid to the flow of vapor (L/V) on a horizontal level, or tray, in a multipass distillation column is equilibrated preferably by designing the horizontal set of panels of the tray with approximately equal tray areas on each side of each downcomer and approximately equal gas throughout capability, taking into account the weir heights, the expected range of viscosities, flow rates, foaming characteristics of the fluid, volatilities, and the like, and then, again taking into account the same factors, adjusting only the relative clearances under the downcomer baffles until the L/V ratio on each side of each downcomer is approximately equal.

More broadly, my invention is applicable even where the tray areas and gas throughputs are not approximately equal but are known, or at least their ratios are known.

DETAILED DESCRIPTION OF THE INVENTION

Fractional distillation is used commercially to separate or purify fluids, and is usually carried out in a column filled with either packing or trays. Because this invention is for use in designing trayed columns, the following discussion will be limited thereto.

A trayed column consists of a stack of trays inside a shell. The trays are provided with holes to permit vapor to rise and vertical channels (downcomers) to permit the liquid to descend. Liquid and vapor are mixed on each tray, thus effecting a stage of distillation. For some columns, more than one downcomer per tray is used to reduce the liquid gradient and to provide liquid handling capacity on the tray. These are called "multipass" trays, and typical layouts of 3 and 4-pass trays are shown more or less diagrammatically in vertical section in FIG. 1. It is critical in the design of a tray to assure that the liquid and vapor are mixed completely and in the right proportion and that none of the liquid or vapor is permitted to leave a tray without this mixing. This is particularly important for multipass trays, where the liquid to vapor ratio (L/V) can be different in each panel. Frequently, some panels are bound to have L/V's greater than needed for the separation and some panels have too low an L/V giving a poor separation. A benefit of this invention is to give the tray designer a convenient means for controlling the distribution of liquid and vapor to each panel.

BRIEF DESCRIPTION OF THE DRAWINGS

FIG. 3 is a more or less diagrammatic side sectional vie of the present invention showing unequal spaces under downcomer baffles.

Figure 2:
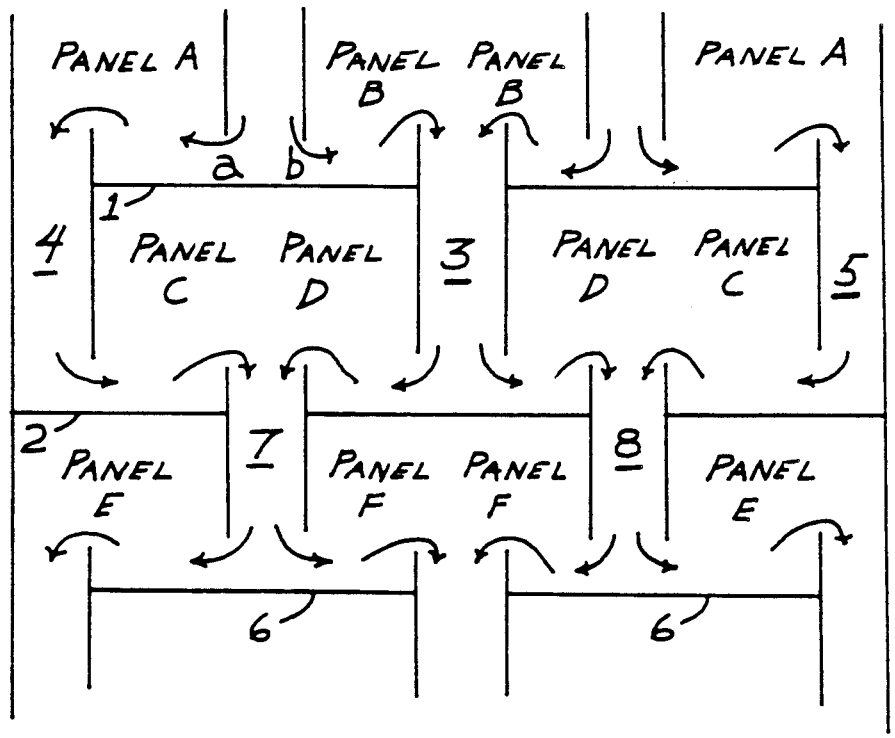

Considering first the 4-pass tray on FIG. 2, the flow of liquid from tray 1 to tray 2 is accomplished through the center downcomer #3 and the two side downcomers #4 and #5. Liquid on tray 2 flows to tray 6 by means of two off-center downcomers #7 and #8. The reason the liquid flows are split like this is to provide adequate downcomer capacity. Vapor flows up through each panel by means of small holes, valves, or bubble caps. The distribution of vapor flow to each panel is determined by the size and number of holes, valves, or bubble caps on each panel, and the relative pressure drop across the panel. The distribution of liquid flow to each panel is a function of many factors. These include such items as the length and width of the liquid flow paths, the velocity of the vapor bubbling up through the liquid, the average height of liquid on the tray, the liquid surface tension and relative density of the liquid and vapor, and the relative pressure above the liquid on the different panels. The interaction of these factors makes the prediction of how much liquid will flow to each panel very difficult. However, computer models have been developed and tested that can calculate the way liquids and vapors will distribute themselves to the different panels.

Figure 1:
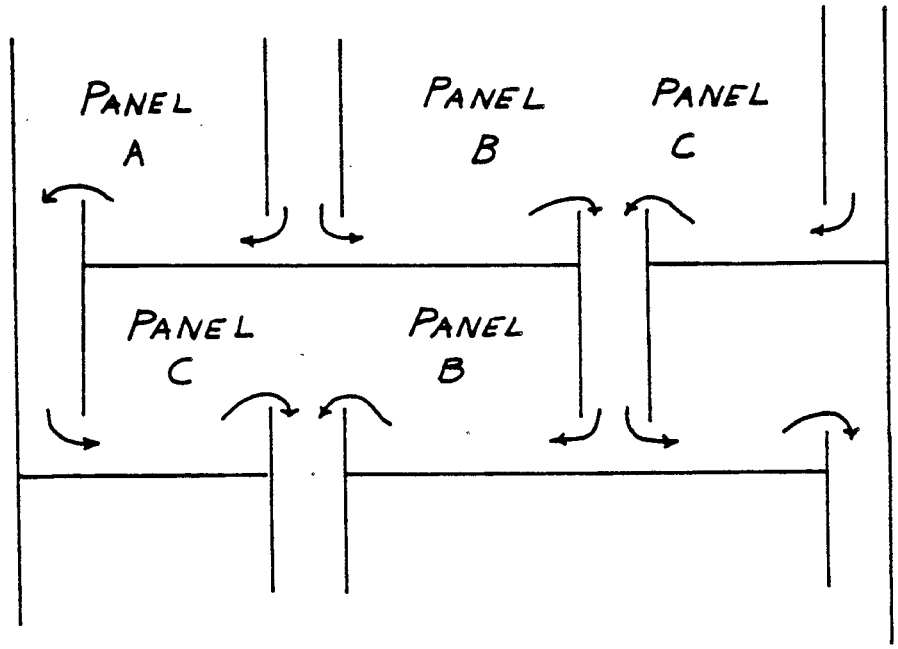
FIG. 1 shows a more or less diagrammatic side sectional view of a conventional 3-pass tray and FIG. 2 shows a conventional 4-pass tray configuration in a cylindrical housing.

One of the difficulties in designing a tray of the type of FIG. 1 or FIG. 2 is to maintain equal L/V ratios in panels A and B. Part of the reason for this is the large difference in the length of the outlet weirs on the two panels. Panel A, being closer to the side of the column, has a relatively short weir (a short chord connecting the cylindrical wall), while panel B, being near the center, has a much longer weir. Although the hydraulics of liquid flow across these panels is complex, it is evident that some design accommodations must be made because of this unbalanced geometry. Several design techniques have been tried to overcome this problem, such as increasing the length of the side weirs by sweeping the ends back, or lowering the side weir height to permit a larger liquid gradient or increasing the size of the side downcomer relative to the center downcomer. In many cases these approaches are satisfactory for the designer's purpose. However, frequently they have the effect of reducing the amount of vapor at the same time they are reducing the liquid flow. Thus, there is generally little or no improvement in the L/V ratio. These design techniques were tried using a computer simulation of an operating column with a severe L/V balance problem, and the results were unsatisfactory. Adjusting the outlet weirs up and down as much as 50% had no noticeable effect on L/V balance.

After trying these techniques with the simulator, other solutions were tried. Surprisingly and contrary to what was expected, it was discovered that if the clearance under the downcomer was changed, the L/Vs could be made to balance. This technique was then investigated for several other design conditions and was always successful in being able to balance the L/Vs.

FIG. 2 is a side sectional view of a multipass tray system showing equal spaces "a" and "b" under the downcomers for a tray. FIG. 3 shows how the flow can be more positively controlled by adjusting the clearance under the downcomer from the tray above.

For example, if dimension "a" is made smaller than dimension "b", below downcomer baffles 9 and 10, as shown, the flow of liquid to panel A will be decreased, and the flow of liquid to panel B will be increased correspondingly. This change in flows will slightly reduce the height of liquid on panel A, thus reducing the relative pressure drop across this panel. The L/V of panel A can be reduced (relative to that of panel B) by reducing dimension "a". Conversely, the L/V can be increased by increasing dimension "a".

With this concept of controlling the L/V ratios by adjusting the clearance under the downcomers, not only is it possible to design multipass trays with balanced L/Vs, but it is possible to build the trays with downcomers that are adjustable, with slotted movable plates bolted to the downcomers, so that the downcomer clearance could be adjusted after the column was placed in operation. It is possible to install sample taps in the side, off-center, and center downcomers to determine if the L/Vs were balanced, and then adjust the clearance after a period of operation.

These sample laps may be used to analyze the liquid on adjacent panels and trays to determine if the change in concentration was equal on each panel. Although the concentration changes may usually be small from tray to tray, small differences can be detected qualitatively and in many cases this may be of sufficient accuracy to determine if the tray panels were balanced.

EXAMPLE

Table 1 shows an example of what happens to the flow distribution when the height of the outlet weir or the clearance under the downcomer is adjusted. The flows shown are calculated using a proprietary tray sieve rating program that was developed by Fractionation Research Incorporated. As shown in this table, for the base case, the liquid to vapor (L/V) ratio on panel A is considerably higher than on panel B (first column in Table 1). To balance the two panels, it will be necessary to reduce the amount of liquid and/or increase the amount of vapor entering panel A. It would appear that one way to reduce the flow of liquid to panel A would be to raise the height of the weir on panel A relative to panel B. However, as shown in Table 1, this technique does not improve the L/V ratio. In fact, the liquid flow to panel A remains virtually unaffected. A tray operating with such an unbalanced flow would result in a poor separation. However, lowering the clearance under the downcomer on panel A (column 4 in Table 1) results not only in reducing the flow of liquid to panel A, as desired, but also increases the flow of vapor to that panel, which further corrects the unbalanced L/V ratios. This effect is inherent in the lowering of the clearance. Lowering the clearance lowers the liquid level on the panel (by lowering the crest of liquid over the weir) and thus reduces the pressure drop across that panel. This causes more vapor to flow through that panel. If the liquid level is increased by raising the outlet weir, the pressure drop on that panel will increase, thus reducing the flow of vapor and thereby negating the reduction in liquid flow.

Table 2 shows the effects of adjusting the downcomer openings on a tray, all other factors being kept steady.

TABLE 1

EFFECT OF TRAY DESIGN ON LIQUID/VAPOR FLOW

| CASE DESCRIPTION | BASE CASE PANEL | | LOWER OUTLET WEIR ON PANEL B PANEL | | RAISE OUTLET WEIR ON PANEL A PANEL | | LOWER CLEARANCE UNDER DOWNCOMER PANEL | |
|---|---|---|---|---|---|---|---|---|
| | A | B | A | B | A | B | A | B |
| Outlet Weir Ht. In. | 2.0 | 2.0 | 2.0 | 1.0 | 3.0 | 2.0 | 2.0 | 2.0 |
| Clearance Under Downcomer In. | 2.25 | 2.25 | 2.25 | 2.25 | 2.25 | 2.25 | 0.9 | 2.25 |
| RESULTS | | | | | | | | |
| L/V (wt. ratio) | 2.13 | 0.40 | 2.17 | 0.40 | 2.27 | 0.38 | 0.87 | 0.87 |
| % Vapor to Each Panel | 27.0 | 73.0 | 26.4 | 73.6 | 25.6 | 74.4 | 36.2 | 63.8 |
| % Liquid to Each Panel | 66.4 | 33.6 | 66.0 | 34.0 | 67.0 | 33.0 | 36.2 | 63.8 |

TABLE 2

| Downcomer Baffle Clearance on Side Furthest from Center | | 2.25 | 2.00 | 1.75 | 1.5 | 1.25 |
|---|---|---|---|---|---|---|
| L/V for Panel | A | 1.244 | 1.156 | 1.059 | .952 | .832 |
| L/V for Panel | B | .587 | .644 | .712 | .793 | .892 |
| L/V for Panel | C | 1.244 | 1.156 | 1.059 | .952 | .832 |
| L/V for Panel | D | .587 | .644 | .712 | .793 | .892 |

I claim:

1. Method of constructing a multipass distillation tower having downcomer baffles comprising designing a horizontal set of panels of at least one tray therein with tray areas and gas throughput capacity on each side of each downcomer baffle in predetermined ratios whereby at least weir heights, downcomer clearances, range of viscosities, flow rates, foaming characteristics of a fluid, and volatilities are taken into account, and adjusting only the clearances under the downcomer baffles until the ratio of the flow of liquid to the flow of vapor (L/V) on a horizontal level, or tray is equilibrated.

2. Method of claim 1 wherein the tray areas and gas throughput are designed to be approximately equal and said predetermined ratio is approximately 1.

* * * * *

UNITED STATES PATENT AND TRADEMARK OFFICE
CERTIFICATE OF CORRECTION

PATENT NO. : 4,995,946

DATED : February 26, 1991

INVENTOR(S) : Robert G. Auger

It is certified that error appears in the above-identified patent and that said Letters Patent is hereby corrected as shown below:

Column 2, line 61, "vie" should be -- view --.

Column 4, line 62, "raIsing" should be -- raising --.

Signed and Sealed this

Twenty-eighth Day of July, 1992

Attest:

DOUGLAS B. COMER

Attesting Officer     Acting Commissioner of Patents and Trademarks